Patented June 6, 1933

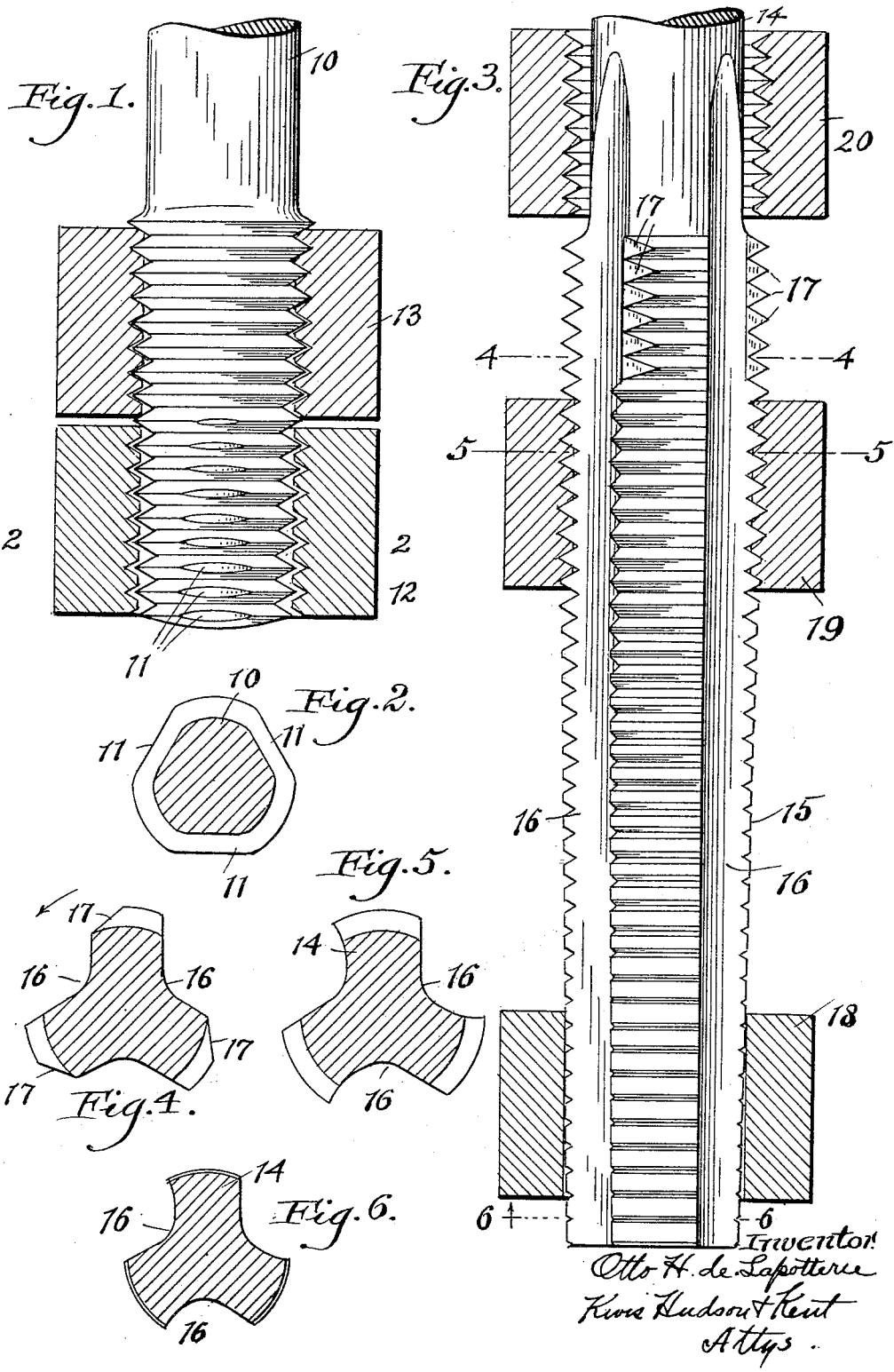
June 6, 1933.　　O. H. DE LAPOTTERIE　　1,912,517
MEANS FOR THREADING NUT BLANKS
Filed March 28, 1929

1,912,517

UNITED STATES PATENT OFFICE

OTTO H. DE LAPOTTERIE, OF KENT, OHIO, ASSIGNOR TO ROY H. SMITH, OF KENT, OHIO

MEANS FOR THREADING NUT BLANKS

Application filed March 28, 1929. Serial No. 350,558

This invention relates to a method and means for threading nut blanks. The method involves two different operations, first, the cutting of a thread in the blank, and, second, the finishing of the cut thread by a swaging operation which smooths and compacts the metal making up the thread and usually deepens it.

In my Patent No. 1,676,482, issued July 10, 1928, I have described a method and a tool for swaging threads into nut blanks in contradistinction to cutting them therein. The invention there described has important advantages, for instance, the strengthening of the threads due to the compacting of the metal therein, and the production of a smooth and accurately dimensioned thread. The process of that patent is well suited to the production of high grade nuts, but the formation of threads in this manner from the ordinary blank is necessarily slow due to the heavy friction encountered, and consequently expensive.

Accordingly, it is an object of the present invention to speed up the production of nuts having finely finished swaged threads.

A further object is the provision of a method of manufacturing nuts utilizing both cutting and swaging in the formation of the threads thereof.

Still another object is the provision of a combination tool designed to be employed in nut threading machines of the ordinary type, upon which tool the nut blank is first subjected to a thread cutting operation and then to a thread swaging operation, whereby threads of unusual strength, fine finish and a high degree of accuracy are produced with facility and speed.

Other objects and features of novelty will appear as I proceed with the description of that embodiment of the invention which, for the purposes of the present application, I have illustrated in the accompanying drawing, in which Fig. 1 is an elevational view, on an enlarged scale, of a portion of a swaging tool, with two nuts shown in section in operative relation with the tool;

Fig. 2 is a cross-section of the same tool taken substantially on the line 2—2 of Fig. 1;

Fig. 3 is an elevational view of the head of a combined thread cutting and swaging tool, three nuts in varying stages of completion being shown in section upon the tool;

Fig. 4 is a cross-sectional view of the swaging portion of the combined tool, the section being taken substantially on the line 4—4 of Fig. 3;

Fig. 5 is a cross-sectional view of a thread cutting portion of the combined tool, the section being taken substantially on the line 5—5 of Fig. 3; and Fig. 6 is a cross-section of the same tool near the end which first enters the nut blank, this section being taken substantially along the line 6—6 of Fig. 3.

In its broader aspects, the method of the present invention may be carried out upon two separate machines or upon a single machine. The machines in either case preferably comprise a tool held against rotation, together with means for feeding the blanks onto the tool and rotating them, the rotating means permitting the threads of the tool to cause the lengthwise travel of the blanks thereupon. Such machines are well known in the art and as they form no part of the present invention they are not illustrated herein.

When two separate machines are employed, the nut blanks are first put through one machine, in which they are threaded by the action of a thread cutting tool. These cut threads are preferably of a depth slightly less than the desired depth for the completed nut. The blanks thus threaded are then placed in the hopper of a second machine, comprising a tool such as that illustrated at 10 in Fig. 1. This tool has a head which is somewhat tapered and is provided with threads which may be substantially continuous. The head of the tool is preferably not round in cross-section, being flattened more or less on one or more sides, preferably three, as shown in Fig. 2.

The threads may also be flatted as shown at 11 opposite the flattened portions of the head in order to accentuate at the small end of the head the relieving of the swaging surfaces at spaced points throughout their periphery. The threads upon this tool, it will be observed, are entirely devoid of cutting surfaces and the transition from the relieved portions to the surfaces of greatest radius is gradual whereby the swaging action is made effective and a minimum amount of power for operation is required.

In Fig. 1, I have shown a threaded nut blank 12 upon the small end of the tool and a second blank 13 in place upon the final portion of the head of the tool. The blanks 12 and 13 are rotated in a machine of the kind above referred to, and are caused to travel up the head of the tool and onto its shaft by the coaction of the threads upon the tool and blanks.

Referring now to means for carrying out the method in a single machine, a tool 14, illustrated in Fig. 3, is employed. This tool is quite similar in appearance to the ordinary threading tap. It comprises a tapered thread cutting portion 15 formed upon a head of circular cross-section. In the formation of the tool, a cylindrical rod is forged with two or more longitudinal grooves 16 therein. The entire head is then threaded and the outer end is cut away to produce a taper as shown in the drawing. Next, the sharp corners of the teeth at the inner end of the head on the side which meets the work during relative rotation are cut away as indicated at 17, so as to make these teeth devoid of cutting surfaces. Thereupon the tool is hardened and the cutting surfaces sharpened in the usual manner.

This tool 14 is placed in a machine and nut blanks 18 are fed onto its small or outer end. Relative rotation between the tool and the blanks is provided in the usual or any desired manner, the blanks being caused to travel along the tool by engagement with the threads thereof. Teeth are gradually cut into the blanks until, when they reach the position indicated by the blank 19 in Fig. 3, the threads are of a depth just slightly under the desired depth for the finished product. Relative rotation is continued without interruption and the blank travels onto the swaging portion of the tool at the inner end of the head thereof. The cutaway ends 17 of the teeth on the swaging part of the tool enter the cut threads of the blank gradually and without any cutting action whatsoever. They then smooth and compact the metal and force it up more or less into their own grooves, thereby deepening to some extent the threads of the nut. At 20 in Fig. 3, I have shown a finished nut ready to travel along the shank of the tool.

The tools illustrated herein may be varied in design more or less without departing from the spirit of the invention, and, hence I desire it to be understood that the detailed disclosure herein is primarily for the purpose of fully illustrating the invention and is not to be considered as constituting a limitation upon the scope thereof.

Having thus described my invention, I claim:

1. A thread forming tool comprising a plurality of teeth in the form of an interrupted thread, cutting edges on the entering end of the teeth for a section of said thread, and swaging edges on the entering end of the teeth of a following section of said thread adapted to swage the threads cut by the first section.

2. A thread forming tool comprising a plurality of teeth in the form of an interrupted tapered thread, a plurality of teeth in the form of an interrupted cylindrical thread which is a continuation of said tapered thread, cutting edges on teeth formed by said tapered thread, and swaging edges on teeth formed by said cylindrical thread adapted to finish the thread cut by said tapered thread by a swaging operation.

3. A thread forming tool comprising a tapered thread, a flute in said tool transverse of said tapered thread and forming cutting edges of said tapered thread, a cylindrical thread which is a continuation of said tapered thread, a second flute in said tool transverse of said cylindrical thread and forming swaging edges on said cylindrical thread adapted to finish the thread cut by said tapered thread by a swaging operation.

4. A tap comprising a shank, a thread on said shank, and a continuous flute in said shank forming cutting edges substantially at right angles to the axis of said tool on the entering part of said thread and forming swaging edges at an inclined angle to the axis of said tool on a following part of said thread which is of greater diameter than the entering part of said thread.

5. A tap comprising a plurality of teeth in the form of an interrupted tapered thread, a plurality of teeth in the form of an interrupted cylindrical thread which is a continuation of said tapered thread, cutting edges on teeth of said tapered thread, and swaging edges on teeth of said cylindrical thread adapted to finish the cut threads by a swaging operation.

In testimony whereof, I hereunto affix my signature.

OTTO H. DE LAPOTTERIE.

CERTIFICATE OF CORRECTION.

Patent No. 1,912,517.  June 6, 1933.

OTTO H. de LAPOTTERIE.

It is hereby certified that error appears in the printed specification of the above numbered patent requiring correction as follows: Page 2, line 93, claim 3, for "of" read "on"; and that the said Letters Patent should be read with this correction therein that the same may conform to the record of the case in the Patent Office.

Signed and sealed this 22nd day of August, A. D. 1933.

M. J. Moore.

(Seal)  Acting Commissioner of Patents.